May 12, 1964     C. B. GARLAND     3,132,729
FORWARD AND REVERSE TRANSMISSION WITH BRAKE
Filed Oct. 5, 1962     2 Sheets-Sheet 1
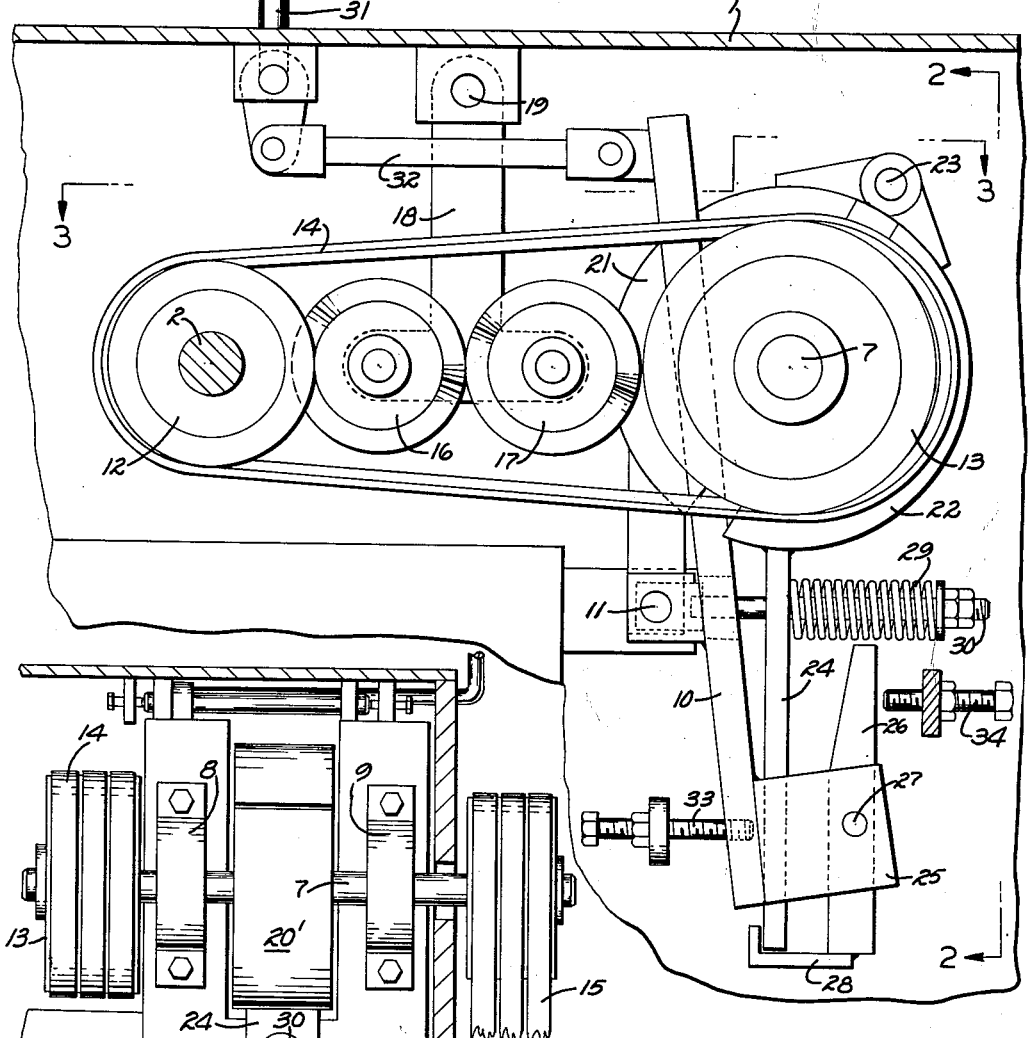
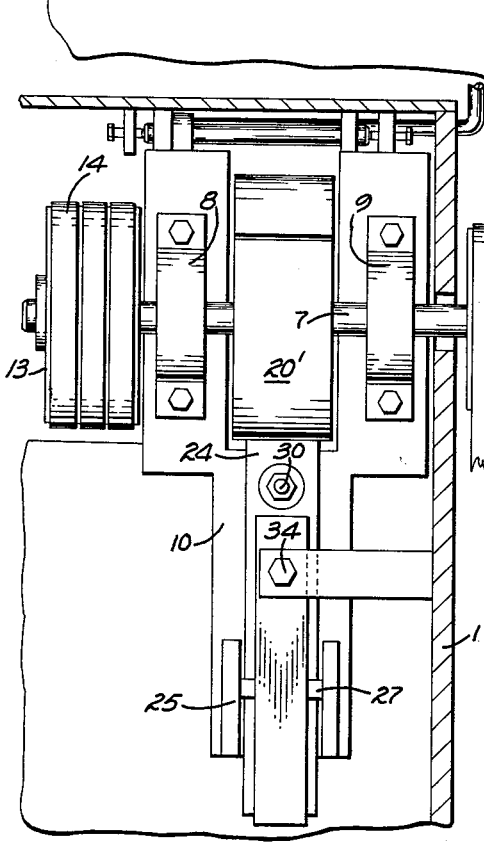
INVENTOR.
CLAUDE B. GARLAND
BY
ATTORNEY May 12, 1964 C. B. GARLAND 3,132,729
FORWARD AND REVERSE TRANSMISSION WITH BRAKE
Filed Oct. 5, 1962 2 Sheets-Sheet 2

INVENTOR.
CLAUDE B. GARLAND
BY
ATTORNEY

United States Patent Office 3,132,729
Patented May 12, 1964

3,132,729
FORWARD AND REVERSE TRANSMISSION WITH BRAKE
Claude B. Garland, 609 Via Horquilla,
Palos Verdes Estates, Calif.
Filed Oct. 5, 1962, Ser. No. 228,625
2 Claims. (Cl. 192—4)

This invention relates to a power drive where power is transmitted from one driving shaft to another driven shaft by means of a belt or belts, and where a reversing mechanism is provided between the pulleys on both the driving and the driven shafts to permit reversal of the driven shaft as required.

My invention may have various adaptations, but it is particularly adapted for use on a crane, and where there is comparatively little power utilized in the reverse direction of the driven shaft.

Another object of my invention is to provide a novel power drive of the character stated, in which the reversing mechanism for the driven shaft is simple and effective and is actuated through a friction drive.

Another object of my invention is to provide a novel brake construction which operates in conjunction with the reversing mechanism, the brake being so constructed that it is always off whenever the driven shaft is rotated either forward or reverse. Also the brake is always on or functioning whenever the drive is being changed from forward to reverse, and vice versa.

Other objects, advantages and features of invention may appear from the accompanying drawing, the subjoined detailed description and the appended claims.

In the drawing:

FIGURE 1 is a fragmentary front elevation of my power drive.

FIGURE 2 is a fragmentary sectional view taken on line 2—2 of FIGURE 1.

Figure 3:
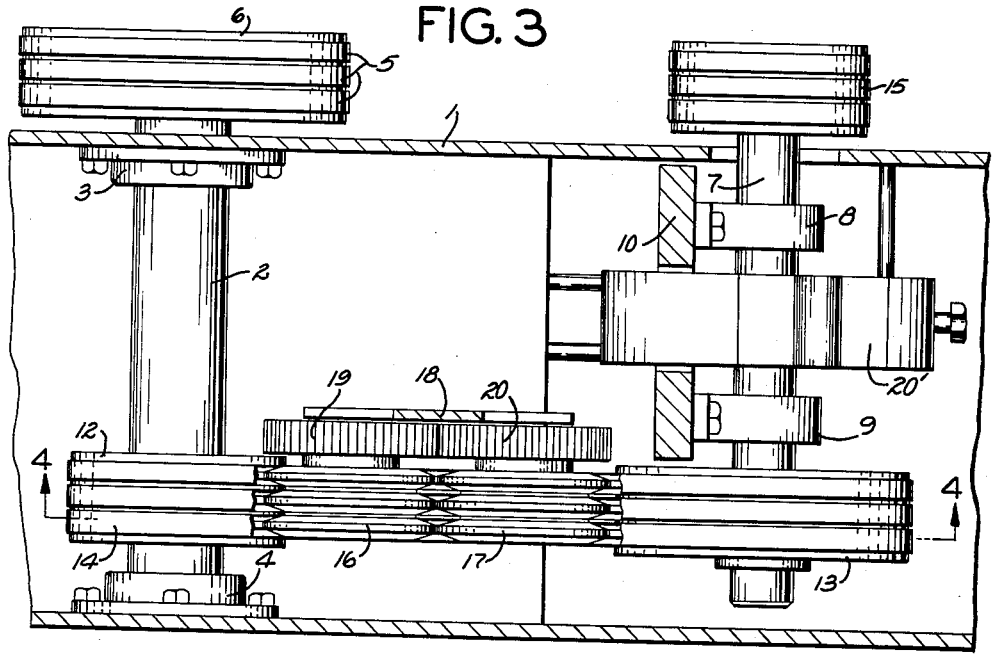
FIGURE 3 is a fragmentary vertical sectional view taken on line 3—3 of FIGURE 1.

Referring more particularly to the drawing, the numeral 1 indicates a frame in which the various parts of the power drive are mounted. A driving shaft 2 is journaled in the frame 1 on suitable bearings 3 and 4. The shaft 2 is driven from a suitable source of power (not shown) through belts 5 which encircle pulleys 6 on the driving shaft; thus the shaft 2 is continuously rotated in one direction. A driven shaft 7 is mounted for limited horizontal swinging movement in the following manner: A pair of bearings 8–9 are mounted on a reversing lever plate 10, which lever is pivotally mounted at 11 to the frame 1 of the power drive. Thus the shaft 7 can be moved horizontally a limited amount by the manually actuated reversing lever 10, as will be subsequently described.

Figure 4:
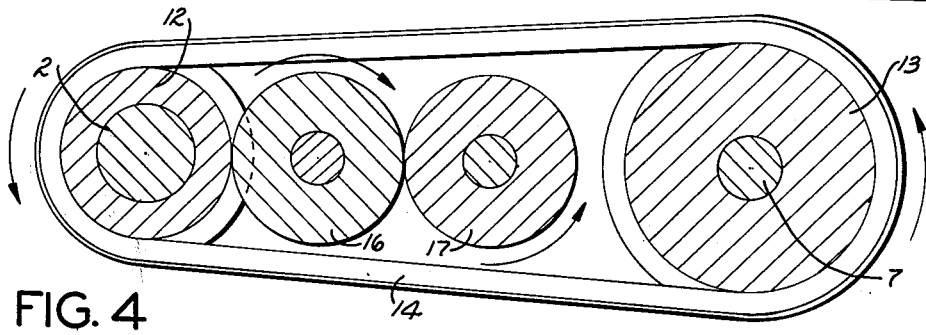
FIGURE 4 is a horizontal sectional view showing the parts in forward drive position.
Figure 5:
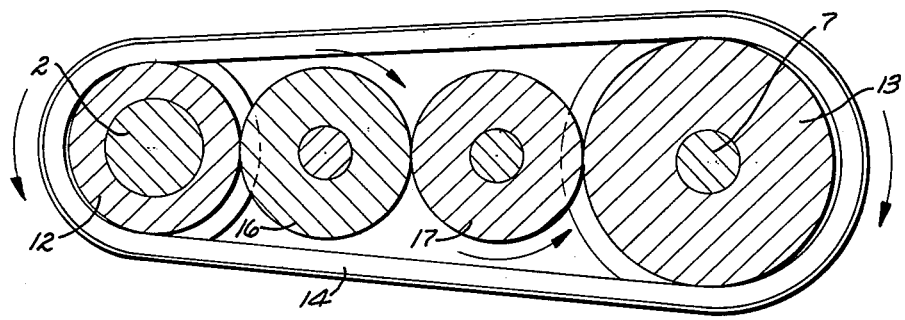
FIGURE 5 is a view similar to FIGURE 4 and showing the parts in reverse drive position.

A plurality of driving pulleys 12 are attached to the driving shaft 2, and a plurality of pulleys 13 are attached to the driven shaft 7. The pulleys 12 and 13 are encircled by V-belts 14, which transmit power from the shaft 2 to the shaft 7. When the driving belts 14 are tight, power is transmitted from the shaft 2 to the shaft 7, and thence to a suitable driven mechanism through the belts 15 in the usual and well known manner. When the shaft 7 is moved horizontally the belts 14 will loosen and, consequently, no drive action will occur from the driving shaft 2 to the driven shaft 7. When the belts 14 are loosened to prevent direct drive to the shaft 7 the reversing mechanism may be actuated, and this mechanism consists of the following structure:

The reversing structure consists of two sets of pulleys 16 and 17 which are journaled on a frame 18 which is pivotally attached to the main frame 1 at 19, so that the pulleys 16–17 will have a limited swinging movement to engage or disengage the driving pulleys 12 and 13. The pulleys 16 and 17 are synchronously driven by the meshing gears 19 and 20, which are mounted on the shafts of the pulleys 16–17 respectively. When the shaft 7 is moved to the left, as viewed in FIGURES 1, 4 and 5, the pulley 13 will engage the reversing pulley 17, and this pulley in turn is driven from the pulley 16 which is engaging the pulley 12 on the driving shaft 2. This position of the parts is best shown in FIGURE 5. In this position the drive to the shaft 7 is reversed and will continue in reverse drive as long as the pulley 13 is held in engagement with the pulley 17.

To enable the transfer to be accomplished from forward drive to reverse drive, I provide a brake structure on the shaft 7 as follows: A brake drum 20′ is mounted on the shaft 7 and this brake drum is engaged by two shoes 21–22 which are both pivotally attached at one end to a mounting pin 23.

The brake shoe 22 is provided with an integral arm 24 which projects downwardly and extends between two spaced guide plates 25 on the lower end of the plate 10. An actuating block 26 is fixedly attached to the plates 25 by the pin 27 so that this actuating block moves back and forth as the plate 10 is swung on its pivot. A hook 28 on the lower end of the block 26 extends around the lower edge of the arm 24 to move that arm in one direction with the movement of the plate 10, as will be subsequently described. A coil spring 29 encircles a mounting rod 30, which rod is secured to the pivot pin 11. One end of the spring 29 bears against the arm 24 to urge that arm in one direction in order to engage the brake shoes 21–22.

The reversing plate 10 is swung on its pivot 11 by means of a manually actuated lever 31, which is connected to the upper end of the plate 10 by means of the link 32.

First assuming that the actuating arm 31 is moved in the forward direction, that is, where the driving shaft 2 is driving the driven shaft 7 through the belts 14. This is shown in FIGURE 4. When the operating lever 31 is thus moved the upper end of the reversing plate 10 will be moved towards the right, as viewed in FIGURE 1. The first of such swinging movement of the reversing plate 10 will cause the actuating block 26 to move to the left, as viewed in FIGURE 1, which moves the hook 28 away from the arm 24. The spring 29 now causes the brake shoes 21–22 to engage the brake drum 20′, tending to reduce the speed of the shaft 7 if it has any primary speed at the time of this movement. Further movement of the reversing plate 10 now moves the arm 24 against a threaded stop screw 33, which pushes the arm 24 against the tension of the spring 29 and releases the brake shoes 21–22. By this time the belts 14 have been tightened in the grooves of the pulleys 12–13 and the shaft 7 is now driven in a forward direction.

If it is desired to reverse the rotation of the shaft 7 the operating arm 31 is moved in the direction indicated as reverse in FIGURE 1, which causes the upper end of the reversing plate to move towards the left, as viewed in FIGURE 1. This causes the lower end of the reversing plate 10 to swing towards the right and permits the arm 24 to move away from the stop 33, whereupon the spring 29 again engages the brake shoes 21–22. The movement of the lower end of the reversing plate 10 continues until the actuating block 26 engages the threaded stop bolt 34, whereupon the block 26 will tilt on its pivot 27, at which time the hook 28 moves the arm 24 towards the right against the tension of the spring 29 to release the brake shoes 21–22. During this movement the belts 14 have been loosened; also the pulleys 13 have been moved into engagement with the pulley 17 and are thus driven in a reverse direction, to reverse rotation of the shaft 7.

Having described my invention, I claim:

1. A power drive comprising a housing,
a drive shaft,
means journaling the drive shaft in the housing, a reversing plate,
means pivotally mounting said plate in the housing, for manual pivoting movement,
a driven shaft,
means journaling the driven shaft on said reversing plate,
drive pulleys on the drive shaft,
driven pulleys on the driven shaft,
belts encircling the drive and driven pulleys,
a first reversing pulley journaled adjacent the drive pulleys and frictionally engaging the drive pulleys,
a second reversing pulley journaled adjacent the driven pulleys and engageable therewith in one position of the parts,
drive means connecting said first and second reversing pulleys to simultaneously rotate the same,
a brake drum on the driven shaft,
brake shoes engaging the drum,
and means extending from the reversing plate to said brake shoes to actuate the brake shoe during part of the movement of the reversing plate from a forward drive to a reverse drive.

2. A power drive comprising a housing,
a drive shaft,
means journaling the drive shaft in the housing,
a reversing plate,
means pivotally mounting said plate in the housing, for manual pivoting movement,
a driven shaft,
means journaling the driven shaft on said reversing plate,
drive pulleys on the drive shaft,
driven pulleys on the driven shaft,
belts encircling the drive and driven pulleys,
a first reversing pulley journaled adjacent the drive pulleys and frictionally engaging the drive pulleys,
a second reversing pulley journaled adjacent the driven pulleys and engageable therewith in one position of the parts,
drive means connecting said first and second reversing pulleys to simultaneously rotate the same,
said reversing plate being manually pivotable to move the driven pulleys into and out of engagement with the second reversing pulleys, thereby reversely driving the driven pulleys,
a brake drum on the driven shaft,
brake shoes engaging the drum,
and means extending from the reversing plate to said brake shoes to actuate the brake shoes during part of the movement of the reversing plate from a forward drive to a reverse drive.

References Cited in the file of this patent

UNITED STATES PATENTS

| 1,450,019 | Canning | Mar. 27, 1923 |
| 2,149,057 | Kohl | Feb. 28, 1939 |
| 2,224,309 | Mack | Dec. 10, 1940 |

FOREIGN PATENTS

| 597,513 | France | Aug. 31, 1925 |